(12) United States Patent
Matsushima

(10) Patent No.: US 9,099,048 B2
(45) Date of Patent: Aug. 4, 2015

(54) LIQUID CRYSTAL DEVICE AND ELECTRONIC APPARATUS

(75) Inventor: Toshiharu Matsushima, Tottori (JP)

(73) Assignee: Japan Display Inc., Tokyo (JP)

( * ) Notice: Subject to any disclaimer, the term of this patent is extended or adjusted under 35 U.S.C. 154(b) by 1169 days.

(21) Appl. No.: 12/405,632

(22) Filed: Mar. 17, 2009

(65) Prior Publication Data

US 2009/0237594 A1    Sep. 24, 2009

(30) Foreign Application Priority Data

Mar. 24, 2008    (JP) ................................ 2008-075087

(51) Int. Cl.
*G02F 1/1335* (2006.01)
*G09G 3/36* (2006.01)
*G02F 1/1343* (2006.01)

(52) U.S. Cl.
CPC ............ *G09G 3/3607* (2013.01); *G09G 3/3648* (2013.01); *G02F 1/134309* (2013.01); *G02F 2001/134372* (2013.01); *G02F 2201/123* (2013.01); *G02F 2201/52* (2013.01); *G09G 2320/068* (2013.01)

(58) Field of Classification Search
CPC .............. G02F 1/134309; G02F 2001/134372; G02F 2201/123; G02F 2201/52; G09G 2320/068; G09G 3/3607; G09G 3/3648
USPC ........... 349/30, 141–144, 62; 345/156, 89–90
See application file for complete search history.

(56) References Cited

U.S. PATENT DOCUMENTS

| | | | | |
|---|---|---|---|---|
| 6,411,355 | B1* | 6/2002 | Manabe et al. ................ | 349/120 |
| 2001/0046003 | A1* | 11/2001 | Song ................................ | 349/43 |
| 2006/0109224 | A1* | 5/2006 | Chang et al. ..................... | 345/89 |
| 2006/0267905 | A1* | 11/2006 | Nishino et al. .................. | 345/98 |
| 2006/0285040 | A1* | 12/2006 | Kobayashi ...................... | 349/117 |
| 2007/0152930 | A1* | 7/2007 | Jin et al. .......................... | 345/87 |
| 2007/0165173 | A1* | 7/2007 | Kazuyoshi et al. ........... | 349/141 |
| 2007/0165174 | A1* | 7/2007 | Kazuyoshi et al. ........... | 349/141 |
| 2007/0176872 | A1* | 8/2007 | Kazuyoshi et al. ............. | 345/90 |
| 2009/0096734 | A1* | 4/2009 | Huang et al. ..................... | 345/89 |

FOREIGN PATENT DOCUMENTS

| | | |
|---|---|---|
| JP | A-2003-233074 | 8/2003 |
| JP | A-2007-079525 | 3/2007 |

(Continued)

OTHER PUBLICATIONS

Japanese Office Action for corresponding JP2008-075087 issued on Aug. 31, 2010.

*Primary Examiner* — Quan-Zhen Wang
*Assistant Examiner* — Tony Davis
(74) *Attorney, Agent, or Firm* — K&L Gates LLP

(57) ABSTRACT

A liquid crystal device includes a pair of substrates with a liquid crystal layer interposed therebetween. A planar region of the pair of substrates has at least one display pixel region and at least one viewing-angle control pixel region that performs dark display in the front direction of surfaces of the pair of substrates and has brightness variable depending on a viewing angle in an oblique direction to the normal direction of the surfaces of the pair of substrates. A pair of electrodes driving the liquid crystal layer is provided in the display pixel region and the viewing-angle control pixel region. A voltage applied between the pair of electrodes in the viewing-angle control pixel region at the time of driving the liquid crystal layer in the viewing-angle control pixel region is higher than a voltage applied between the pair of electrodes in the display pixel region.

13 Claims, 11 Drawing Sheets

(56) References Cited

FOREIGN PATENT DOCUMENTS

| JP | 2007-178736 | 7/2007 |
| JP | 2007-183618 | 7/2007 |
| JP | A-2007-178736 | 7/2007 |
| JP | A-2007-178738 | 7/2007 |
| JP | A-2007-178739 | 7/2007 |
| JP | A-2008-111901 | 5/2008 |

* cited by examiner

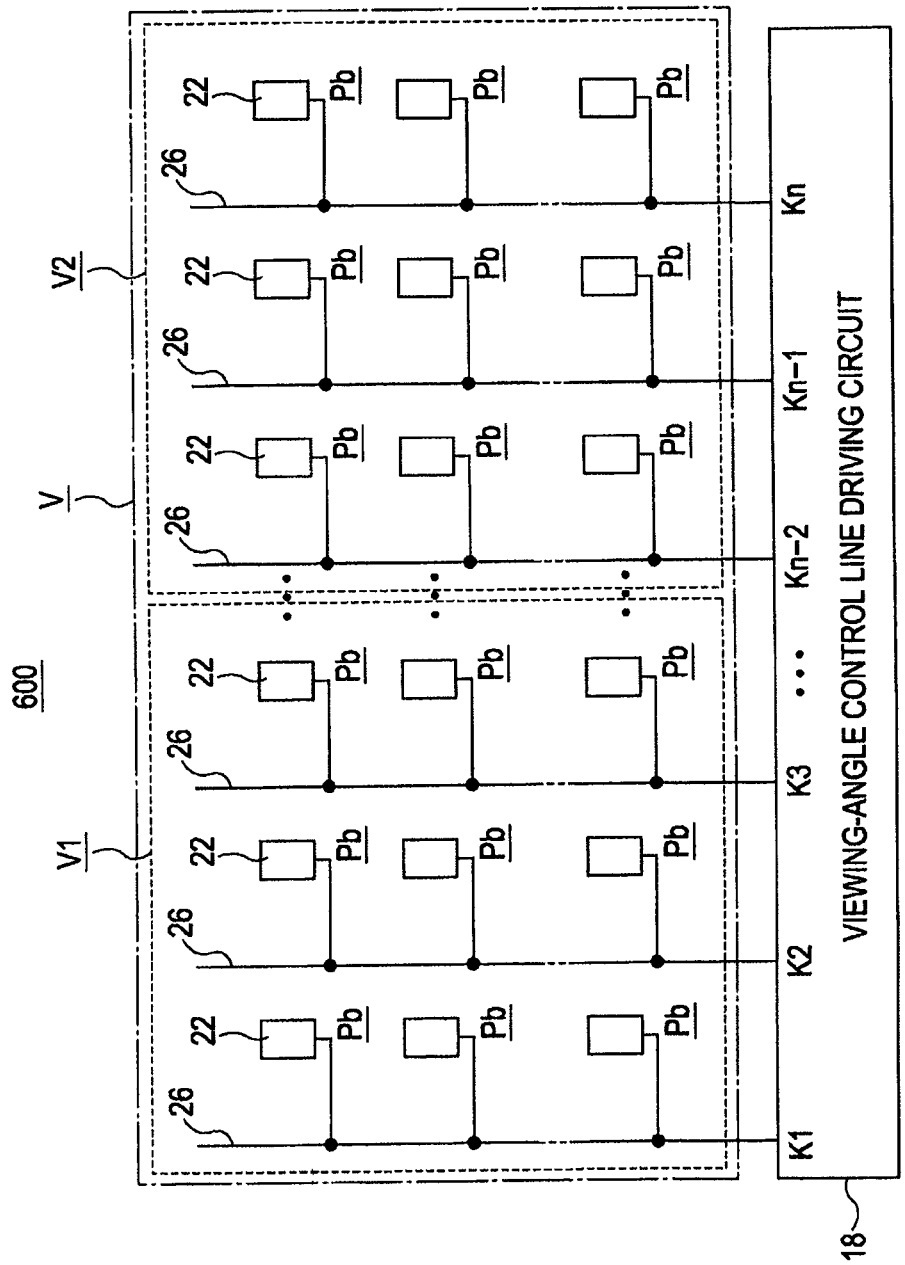

LIQUID CRYSTAL DEVICE AND ELECTRONIC APPARATUS

BACKGROUND

1. Technical Field

The present invention relates to a liquid crystal device capable of switching display modes of a wide viewing angle and a narrow viewing angle and an electronic apparatus having the same.

2. Related Art

Recently, a liquid crystal device has come into widespread use in electronic apparatuses such as a mobile phone, a portable information terminal, and a computer display. In such a liquid crystal device, a wide viewing angle characteristic is necessary when many people look at a displayed image in various directions, and a narrow viewing angle characteristic is necessary when it is desired not to show the displayed image to the people around a user.

For this reason, a liquid crystal device capable of switching a display mode between a wide viewing angle and a narrow viewing angle was proposed (for example, refer to JP-A-2007-79525, JP-A-2007-178736, JP-A-2007-178738, JP-A-2007-178739, and JP-A-2003-233074).

In JP-A-2007-79525, there is disclosed a vertical alignment or twisted nematic liquid crystal display device having a configuration in which RGB color pixels and a W pixel are provided as one unit and the RGB color pixels and the W pixel have different viewing angle characteristics. By adopting such a configuration, a wide viewing-angle display mode and a narrow viewing-angle display mode can be switched.

In JP-A-2007-178736, JP-A-2007-178738 and JP-A-2007-178739, there is disclosed a FFS (Fringe Field Switching) mode liquid crystal display device having a configuration in which RGB pixels and viewing-angle control pixels are provided and each viewing-angle control pixel is brought under alignment control such that the liquid crystal molecules tilt vertically or horizontally. By adopting such a configuration, an angle of view can be controlled in vertical and horizontal directions. In the liquid crystal display device, a control voltage is applied to the viewing-angle control pixels through viewing-angle control lines separated from the RGB pixels. In this manner, it is possible to tilt the liquid crystal molecules vertically or horizontally, thereby controlling the viewing angle.

In a liquid crystal display device disclosed in JP-A-2007-178738, each viewing-angle control pixel is not connected to a TFT (Thin Film Transistor) as a switching element, and is directly connected to a signal line, and a voltage signal is applied to all the viewing-angle control pixels when it is intended to conceal display information on a whole display screen. In this case, display unevenness can also be suppressed by adjusting a signal center of the viewing-angle control pixels to coincide with a common voltage of the RGB pixels through a unit for adjusting a viewing-angle control voltage.

In JP-A-2003-233074, there is disclosed a liquid crystal display device configured such that a fixed pattern irrespective of a display screen is visible when the display is viewed from directions other than the front direction. By adopting such a configuration, displayed contents can be protected from being seen by another person.

The recent liquid crystal display device is classified into a vertical electric field mode and a horizontal electric field mode in accordance with an electric field direction. The vertical electric field mode is a mode of generating an electric field (vertical electric field) between an upper substrate and a lower substrate on which electrodes are formed, and the liquid crystal display device disclosed in JP-A-2007-79525 is an example of this mode. On the other hand, the horizontal electric field mode is a mode of generating an electric field (horizontal electric field) in a direction substantially parallel to a side of one substrate, on which electrodes are formed, of a pair of substrates, and the FFS mode liquid crystal display devices disclosed in JP-A-2007-178736, JP-A-2007-178738, and JP-A-2007-178739 arm examples of this mode.

However, a problem arises in that the horizontal electric field mode liquid crystal display device is inferior to the vertical electric field mode liquid crystal display device of the in viewing-angle control effect.

SUMMARY

An advantage of some aspects of the invention is that it provides a horizontal electric field mode liquid crystal display device capable of lowering contrast of an image when a display screen is viewed in a direction oblique to a normal direction thereof at a display mode of a narrow viewing angle by optimizing a driving voltage of viewing-angle control pixels relative to display pixels, and an electronic apparatus having the same.

According to an aspect of the invention, a liquid crystal device includes a pair of substrates with a liquid crystal layer interposed therebetween. A planar region of the pair of substrates has at least one display pixel region and at least one viewing-angle control pixel region that performs dark display in the front direction of surfaces of the pair of substrates and has brightness variable depending on a viewing angle in an oblique direction to the normal direction of the surfaces of the pair of substrates. A pair of electrodes driving the liquid crystal layer is provided in the display pixel region and the viewing-angle control pixel region on one substrate of the pair of substrates. A voltage applied between the pair of electrodes in the viewing-angle control pixel region at the time of driving the liquid crystal layer in the viewing-angle control pixel region is higher than a voltage applied between the pair of electrodes in the display pixel region.

In the liquid crystal device according to this aspect of the invention, when an appropriate voltage is applied between the pair of electrodes in the display pixel region, bright display having the maximum transmittance or brightness is performed as a display screen is viewed from the front direction, and bright display having brightness depending on a polar angle is performed as the display screen is viewed from the oblique direction to the normal direction. When an appropriate voltage is applied between the pair of electrodes in the viewing-angle control pixel region, dark display is performed as a display screen is viewed from the front direction, and brightness varies depending on a polar angle as the display screen is viewed from the oblique direction to the normal direction. For example, brightness increases (bright display) as the polar angle increases and brightness decrease (dark display) as the polar angle increases further. In this manner, the pair of electrodes in the viewing-angle control pixel region and the pair of electrodes of the display pixel region are driven independently.

For this reason, when the viewing-angle control pixel regions do not control a viewing angle, an image formed on the display pixel regions is not regulated by the viewing-angle control pixel regions, and is visible from a wide viewing angle. When the viewing-angle is controlled, the viewing-angle control pixel region performs dark display as the display screen is viewed from the front thereof. Therefore, it is possible to obtain high contrast, and thus the image formed on the display pixel regions may be visible without regulation. However, brightness varies in the viewing-angle control pixel region as the display screen is viewed from the oblique direction to the normal direction. Therefore, contrast of the image is lowered, and thus the image may not be visible. In this case, preferably, assuming that an azimuthal angle of the normal direction of the surfaces of the pair of substrates is 0°, a peak of the transmittance of the viewing-angle control pixel region exists in an angular range of 40° to 60° from the normal direction to the surfaces of the pair of substrates.

In this case, by making a voltage applied between the pair of electrodes in the viewing-angle control pixel region at the time of driving the liquid crystal layer in the viewing-angle control pixel region higher than a voltage applied between the pair of electrodes in the display pixel region, for example, brightness of when the display screen is viewed from the oblique direction to the normal direction is varied. Therefore, it is possible to lower contrast of the image viewed from the oblique direction. As a result, it is possible to make it more difficult to discriminate the image viewed from the oblique direction.

In this case, preferably, the voltage corresponding to the maximum value of transmittance of the viewing-angle control pixel region is higher than the voltage corresponding to the maximum value of transmittance of the display pixel region. For example, it is possible to adopt a configuration in which the voltage corresponding to the maximum value of transmittance of the display pixel region is set as about 6V. In this case, the voltage corresponding to the maximum value of transmittance of the viewing-angle control pixel region can be set in the range of 10 to 15V. As a result, it is possible to set the voltage of the viewing-angle control pixel region as an optimum value for realizing the narrow viewing-angle display mode, relative to the voltage of the display pixel region.

In the liquid crystal device according to this aspect of the invention, preferably, one electrode of the pair of electrodes in the viewing-angle control pixel region is directly connected to a line supplied with a control signal (for example, ON or OFF signal). In this case, preferably, the one electrode in the viewing-angle control pixel region is connected to a viewing-angle control line driving circuit through the line. The viewing-angle control line driving circuit is configured to include a switching element such as transistor capable of switching electric signals (ON/OFF). The viewing-angle control line driving circuit supplies the control signal (for example, ON or OFF signal) to the one electrode of the pair of electrodes in the viewing-angle control pixel region, for example, by turning the switching element ON/OFF. In addition, the circuit supplies a signal corresponding toga predetermined reference electric potential to the other electrode in the viewing-angle control pixel region. By adopting such a configuration, it is possible to easily and efficiently apply a high voltage (viewing-angle control signal) to the one electrode in the viewing-angle control pixel region without applying a load to a driver IC for driving the liquid crystal layer and the like. As a result, the narrow viewing-angle display mode can be realized without difficulty by supplying one electrode in the viewing-angle control pixel region with a high voltage, for example, the control signal (ON signal) corresponding to the range of 10 to 15V.

In the liquid crystal device according to this aspect of the invention, preferably, the viewing-angle control line driving circuit simultaneously supplies the control signals (for example, ON or OFF signal) different from each other to the viewing-angle control pixel regions, respectively.

By adopting such a configuration, for example, the viewing-angle control line driving circuit is capable of supplying an ON signal to an arbitrary viewing-angle control pixel region among a plurality of viewing-angle control pixel regions and simultaneously capable of supplying an OFF signal to another viewing-angle control pixel region different from the arbitrary viewing-angle control pixel region. Accordingly, by dividing a display screen (the planar region) into a plurality of display region (for example, two display regions), different viewing-angle controls (that is, narrow viewing-angle control and wide viewing-angle control) are performed on the divided display regions, respectively. For example, by applying the liquid crystal device having the configuration to a display apparatus such as a navigation system mounted on a vehicle, a map for guiding a user's destination and the like and an image (TV program, movie, or the like) different from the map can be displayed on the display screen (dual picture display). In this case, the viewing-angle control pixels for the display region on which the map is displayed is supplied with a control signal as an OFF signal from the viewing-angle control line driving circuit through the line, and simultaneously the viewing-angle control pixels for the display region on which the image different from the map is displayed is supplied with a control signal as an ON signal from the viewing-angle control line driving circuit through the line. By adopting such a configuration, only the map can be allowed to be visible for a driver sitting on a driver's seat which is positioned obliquely to a display screen such as a navigation system, and thus it is possible to secure driving safety. On the other hand, both of the map and the image may be allowed to be visible for a passenger sitting on the back seat, which is positioned in front of the display screen such as the navigation system.

In the liquid crystal device according to this aspect of the invention, preferably, a direction of an electric field induced between the pair of electrodes in the viewing-angle control pixel region crosses an initial orientation direction of liquid crystal molecules forming the liquid crystal layer along the normal direction of the surfaces of the pair of substrates.

In such a configuration, the liquid crystal molecules are oriented in the normal direction of the surfaces of the pair of substrates when a voltage is applied between the pair of electrodes in the viewing-angle control pixel region. Thus, in the region, dark display is performed as a display screen is viewed from the front direction, and brightness varies depending on a polar angle as the display screen is viewed from the oblique direction to the normal direction.

In the liquid crystal device described above, preferably, the viewing-angle control pixel region is provided to correspond to the at least one display pixel region.

By adopting such a configuration, it is possible to effectively lower contrast of the image as the display screen is viewed form the oblique direction to the normal direction when transmittance or brightness of the image formed by the plurality of display pixel regions is high.

According to another aspect of the invention, an electronic apparatus can be configured to include the above-mentioned liquid crystal device as a display unit. By adopting such a configuration, for example, it is possible to realize an electronic apparatus that has both wide viewing-angle and narrow viewing-angle display modes and is capable of lowering image contrast as the display screen is viewed from the oblique direction to the normal direction at the narrow viewing-angle display mode.

BRIEF DESCRIPTION OF THE DRAWINGS

The invention will be described with reference to the accompanying drawings, wherein like numbers reference like elements.

FIGS. 6A and 6B are graphs illustrating relationship between driving voltage and transmittance of the sub-display pixels and the like.

FIG. 7 is an equivalent circuit diagram of a viewing-angle control circuit according to a modified example of the invention.

DESCRIPTION OF EXEMPLARY EMBODIMENTS

Figure 1:
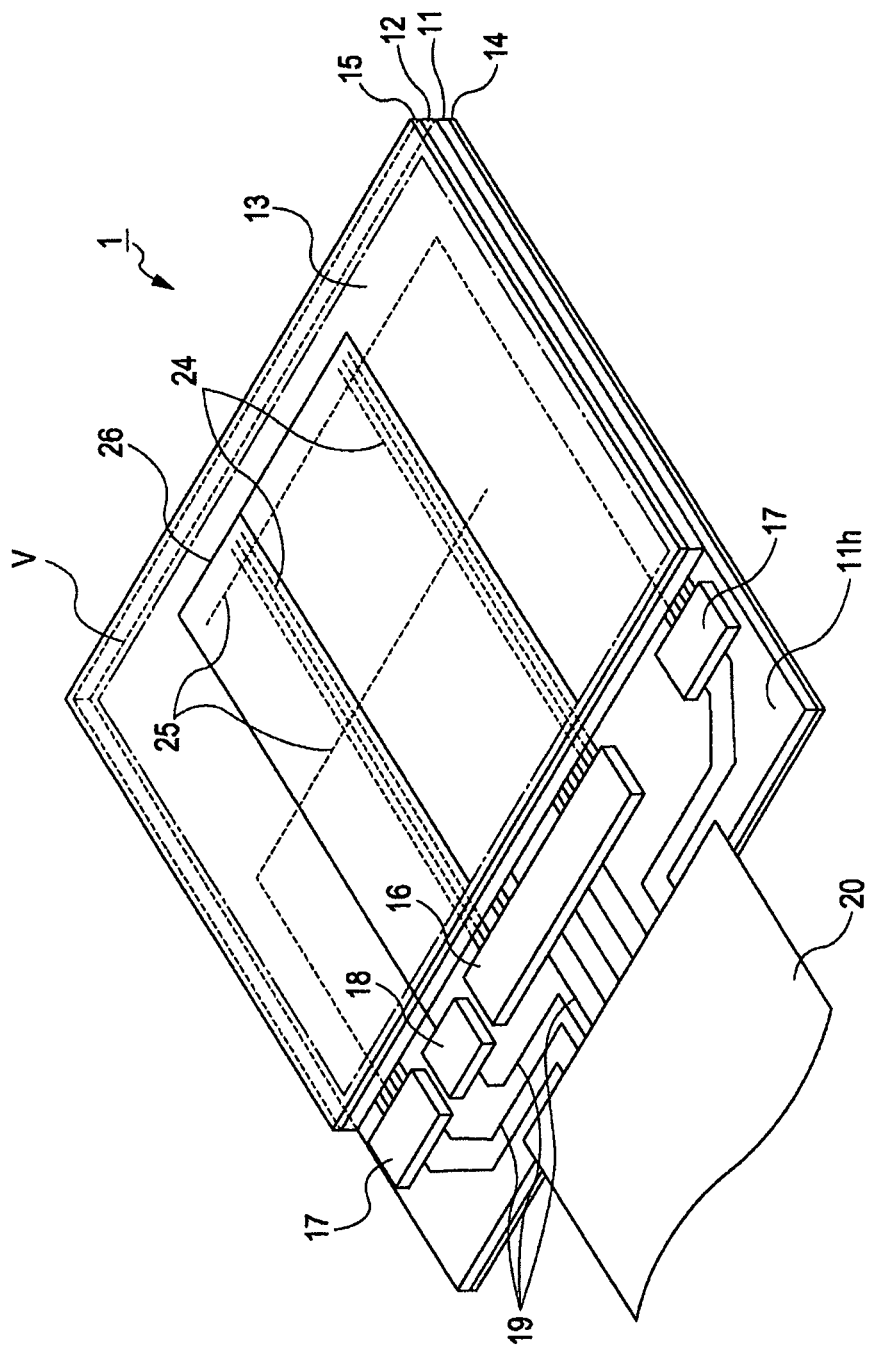
FIG. 1 is a perspective view illustrating a schematic configuration of a liquid crystal device according to an embodiment of the present invention.

Hereinafter, embodiments of the invention will be described with reference to the accompanying drawings.
Configuration of Liquid Crystal Device First, a schematic configuration of a liquid crystal device 1 according to an embodiment of the invention will be described with reference to FIG. 1. FIG. 1 is a perspective view illustrating a schematic configuration of the liquid crystal device 1 according to the embodiment. In FIG. 1, a viewing-angle control line 26 is represented by a solid line for explanatory convenience.

The liquid crystal device 1 is a liquid crystal device of FFS (Fringe-Field Switching) mode as an example of a horizontal electric field mode. The liquid crystal device 1 is configured such that an array substrate 11 having TFTs (Thin Film Transistor) for controlling switching of display pixels is attached to a counter substrate 12 with a sealant (not shown), which is formed in a frame shape, interposed therebetween, and for example, a nematic liquid crystal layer 13 having positive dielectric anisotropy is sandwiched by the array substrate 11 and the counter substrate 12 in an area partitioned by the sealant positioned therebetween. An image display region (area surrounded by a chain line) V for displaying an image is formed inside the sealant in the liquid crystal device 1.

The array substrate 11 has an overhang region 11h overhanging from one end of the counter substrate 12 to the outside. A data line driving circuit 16, a scanning line driving circuit 17, a viewing-angle control line driving circuit 18, a plurality of external connection lines 19, and an FPC (Flexible Printed Circuits) 20 are formed or mounted on a surface of the overhang region 11h facing the counter substrate 12. The data line driving circuit 16, the scanning line driving circuit 17 and the viewing-angle control line driving circuit 18 are electrically connected to the FPC 20 through the corresponding external connection lines 19. A first polarizer 14 is disposed on a side of the array substrate 11 opposite the liquid crystal layer 13. A second polarizer 15 is disposed on a side of the counter substrate 12 opposite the liquid crystal layer 13. A backlight (not shown) as an illumination device is disposed on a side of the first polarizer 14 opposite the array substrate 11.

Figure 2:
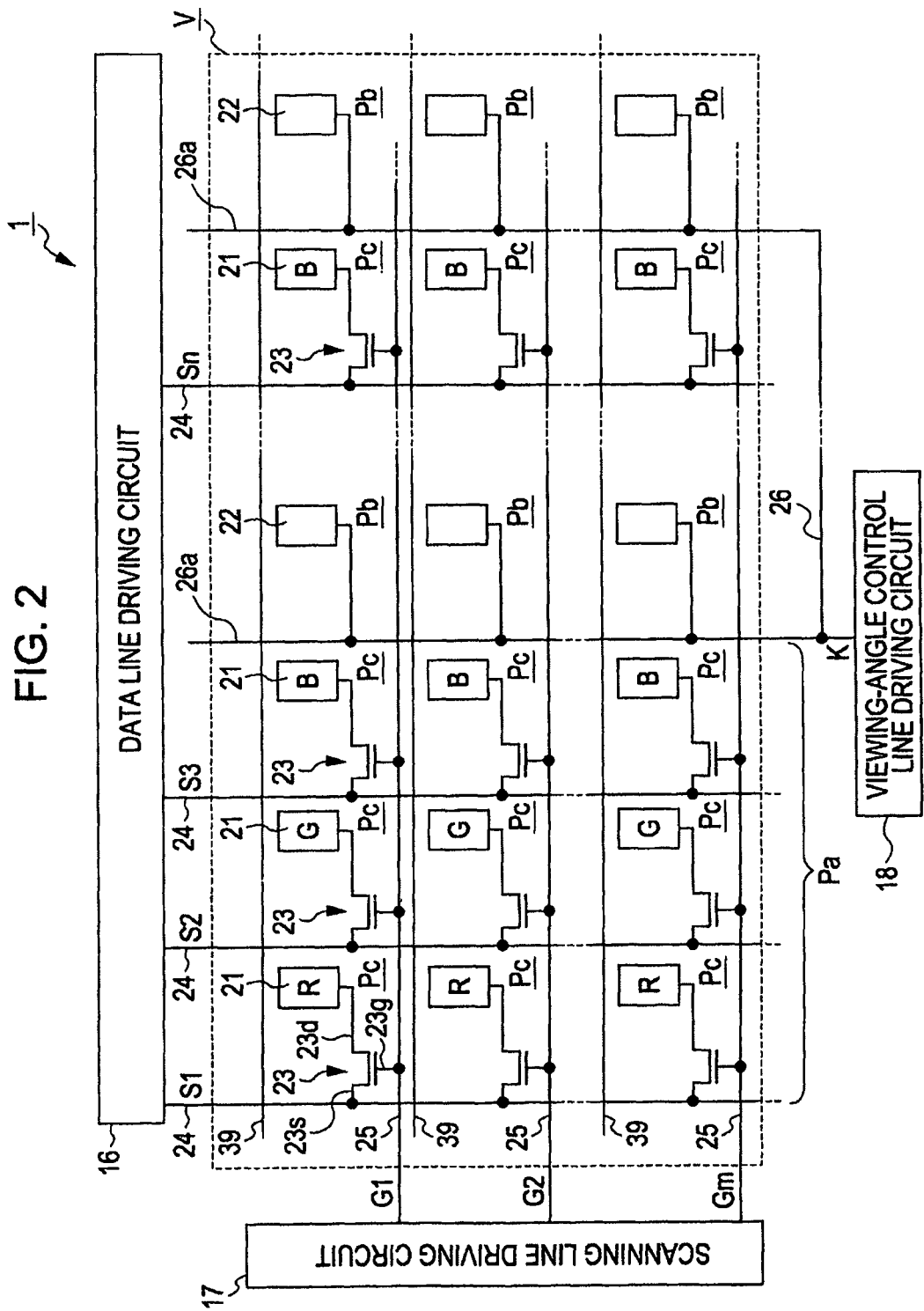
FIG. 2 is an equivalent circuit diagram illustrating an electrical configuration of the liquid crystal device according to the embodiment.

Next, an electrical configuration of the liquid crystal device 1 according to the embodiment will be described with reference to FIG. 2. FIG. 2 is an equivalent circuit diagram illustrating an electrical configuration of the liquid crystal device 1.

A plurality of display pixels (display pixel regions) Pa and viewing-angle control pixels (viewing-angle control pixel regions) Pb are arrayed in a matrix shape within the image display region V of the liquid crystal device 1. In addition, a plurality of data lines 24, a plurality of viewing-angle control lines 26 and a plurality of scanning lines 25 are arranged thereon in a lattice shape.

Each display pixel Pa has three sub-display pixels (sub-display pixel regions) Pc that output light having different colors, for example, R (red), G (green), and B (blue), respectively. The three sub-display pixels Pc forming the display pixel Pa, that is, sub-display pixels Pc of R, G, and B are arranged in this order along a single direction (along an extending direction of the scanning line 25 in this example). However, the invention is not limited to the order for arranging the sub-display pixels Pc of the respective colors of R, G, and B. Each sub-display pixel Pc is configured to have a pixel electrode 21 and a TFT 23 for controlling switching of the pixel electrode 21. The TFT 23 has a source electrode 23s, a gate electrode 23g, and a drain electrode 23d. The source electrode 23s is electrically connected to the data line 24. The gate electrode 23g is electrically connected to the scanning line 25. The drain electrode 23d is electrically connected to the pixel electrode 21.

The viewing-angle control pixels Pb are disposed to correspond to the plurality of display pixels Pa, respectively. In this example, each viewing-angle control pixel Pb is disposed between the sub-display pixel Pc of blue B belonging to one arbitrary display pixel Pa and the sub-display pixel Pc of red R belonging to one different display pixel Pa which is disposed adjacent to the one arbitrary display pixel Pa in the extending direction of the scanning line 25. The viewing-angle control pixel Pb has the pixel electrode 22 without the TFT 23. The viewing-angle control pixels Pb are driven by the viewing-angle control lines 26 and the viewing-angle control line driving circuit 18 to be described later, independently of the sub-display pixels Pc.

The data line driving circuit 16 supplies image signal S1 to Sn to the sub-display pixels Pc through the data lines 24. The scanning line driving circuit 17 supplies scanning signals G1 to Gm to the sub-display pixels Pc through the scanning lines 25.

The viewing-angle control lines 26 have a pectinate shape, and have a plurality of pectinate portions 26a. The pectinate portions 26a are directly and electrically connected to the viewing-angle control pixels Pb arrayed in columns in the extending direction of the data lines 24. Further, the viewing-angle control lines 26 are electrically connected to the viewing-angle control line driving circuit 18.

The viewing-angle control line driving circuit 18 supplies a viewing-angle control signal (for example, an ON signal) K to the viewing-angle control lines 26, at the narrow viewing-angle display mode, independently of the data line driving circuit 16 and the scanning line driving circuit 17. On the other hand, the circuit supplies a viewing-angle control signal (for example, an OFF signal) K to the viewing-angle control lines 26. In other words, the circuit stops supplying the viewing-angle control signal K, at the wide viewing-angle display mode. Preferably, the viewing-angle control line driving circuit 18 is configured to include a switching element such as a transistor which is capable of switching an electric signal (ON/OFF). In this case, the viewing-angle control line driving circuit 18 is capable of supplying the viewing-angle control signal (ON/OFF signal) K to the viewing-angle control lines 26 by turning the switching element ON/OFF.

Next, a specific configuration of the liquid crystal device 1 will be described with reference to FIGS. 3 and 4.

Figure 3:
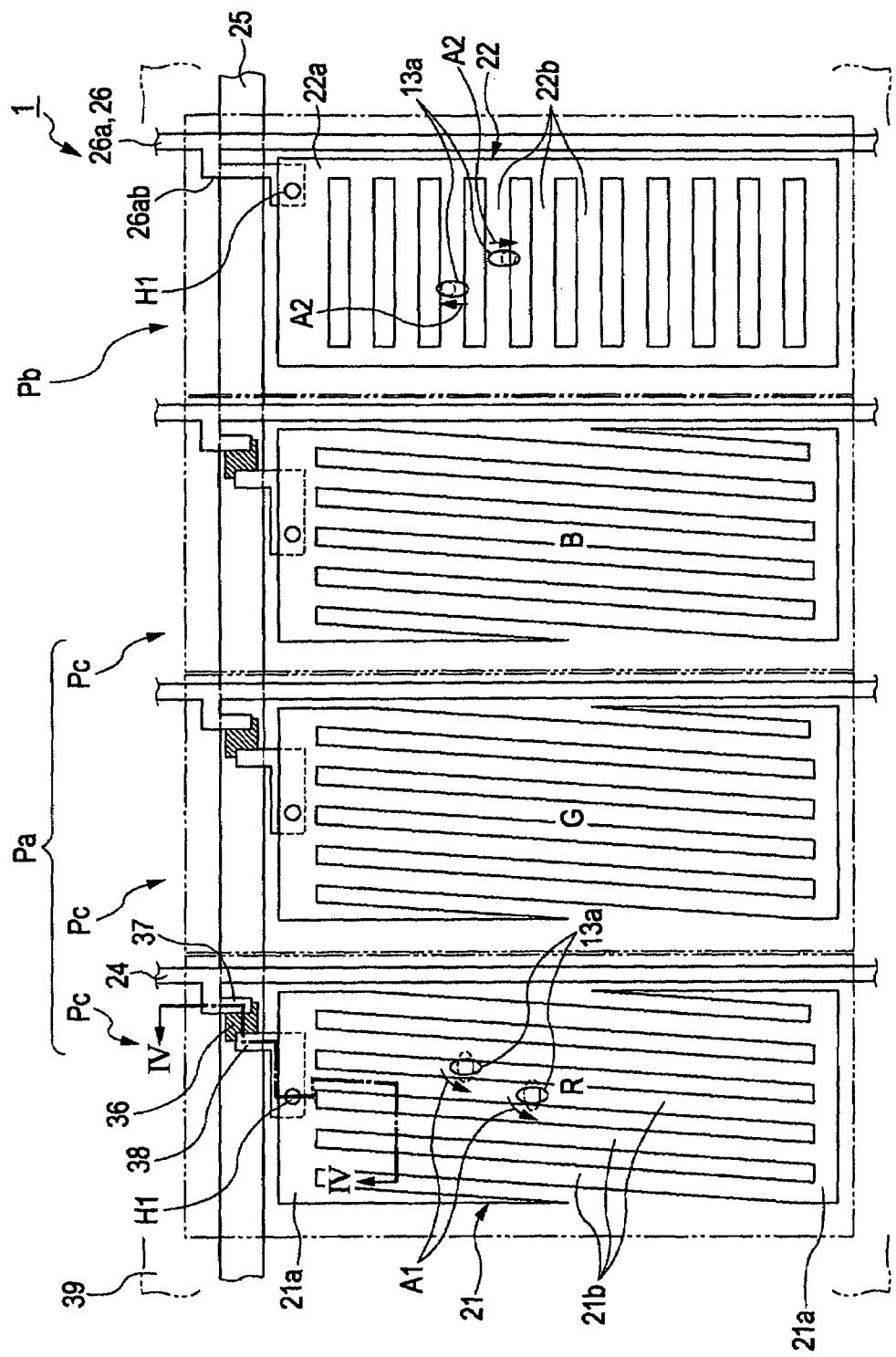
FIG. 3 is a top plan view illustrating a configuration of sub-display pixels and a viewing-angle control pixel.

FIG. 3 is a top plan view illustrating a configuration of one arbitrary display pixel Pa formed of three sub-display pixels Pc and one viewing-angle control pixel Pb corresponding to the one arbitrary display pixel Pa, in the liquid crystal device 1. FIG. 4 is a sectional view illustrating a main part of the liquid crystal device 1 taken along line IV-IV of FIG. 3.

First, the array substrate 11 is configured as follows.

The array substrate 11 has a substrate body 31, which is formed of a transparent material such as glass, quartz, or plastic, and a gate insulating film 32, a first interlayer insulating film 33, a second interlayer insulating film 34, and an alignment film 35 which are sequentially laminated from a side of the substrate body 31 facing the liquid crystal layer 13 toward the liquid crystal layer 13. In the array substrate 11, there are provided the scanning lines 25 which are formed on the side of the substrate body 31 facing the liquid crystal layer 13. There are further provided data lines 24, the viewing-angle control lines 26 (not shown), a semiconductor layer 36, source electrodes 37, and drain electrodes 38 which are formed on a side of the gate insulating film 32 facing the liquid crystal layer 13. There are further provided a common electrode 39 which is formed on a side of the first interlayer insulating film 33 facing the liquid crystal layer 13, and the pixel electrodes 21 and the pixel electrodes 22 (not shown) which are formed on a side of the second interlayer insulating film 34 facing the liquid crystal layer 13.

The gate insulating film 32 formed of a transparent material such as $SiO_2$ (silicon oxide) is provided to cover the scanning lines 25 formed on the substrate body 31. The first interlayer insulating film 33 formed of a transparent material such as SiN (silicon nitride) is provided to cover the gate insulating film 32 together with the data lines 24, the viewing-angle control lines 26 (not shown), the semiconductor layer 36, the source electrodes 37, and the drain electrodes 38 which are formed on the gate insulating film 32. The second interlayer insulating film 34 formed of a transparent material such as acrylic having photosensitivity is provided to cover the first interlayer insulating film 33 together with the common electrode 39 formed on the first interlayer insulating film 33. The alignment film 35 formed of a transparent material such as polyimide resin is provided to cover the second interlayer insulating film 34 together with the pixel electrodes 21 and pixel electrodes 22 (not shown) formed on the second interlayer insulating film 34. A surface of the alignment film 35 facing the liquid crystal layer 13 is subjected to an alignment process. The process sets an initial orientation direction of the liquid crystal molecules 13a constituting the liquid crystal layer 13 as a predetermined direction (the extending direction of the data line 24 in this example).

The scanning lines 25 are disposed to extend in a widthwise direction of the sub-display pixels Pc and viewing-angle control pixels Pb in plan view, as shown in FIG. 3. The scanning lines 25 overlap channel regions of the semiconductor layer 36 with the gate insulating film 32 interposed therebetween, as shown in FIGS. 3 and 4. The data lines 24 are disposed to extend in a lengthwise direction of the sub-display pixels Pc in plan view, as shown in FIG. 3. The viewing-angle control lines 26 are disposed to extend in a lengthwise direction of the viewing-angle control pixels Pb in plan view, as shown in FIG. 3.

Figure 4:
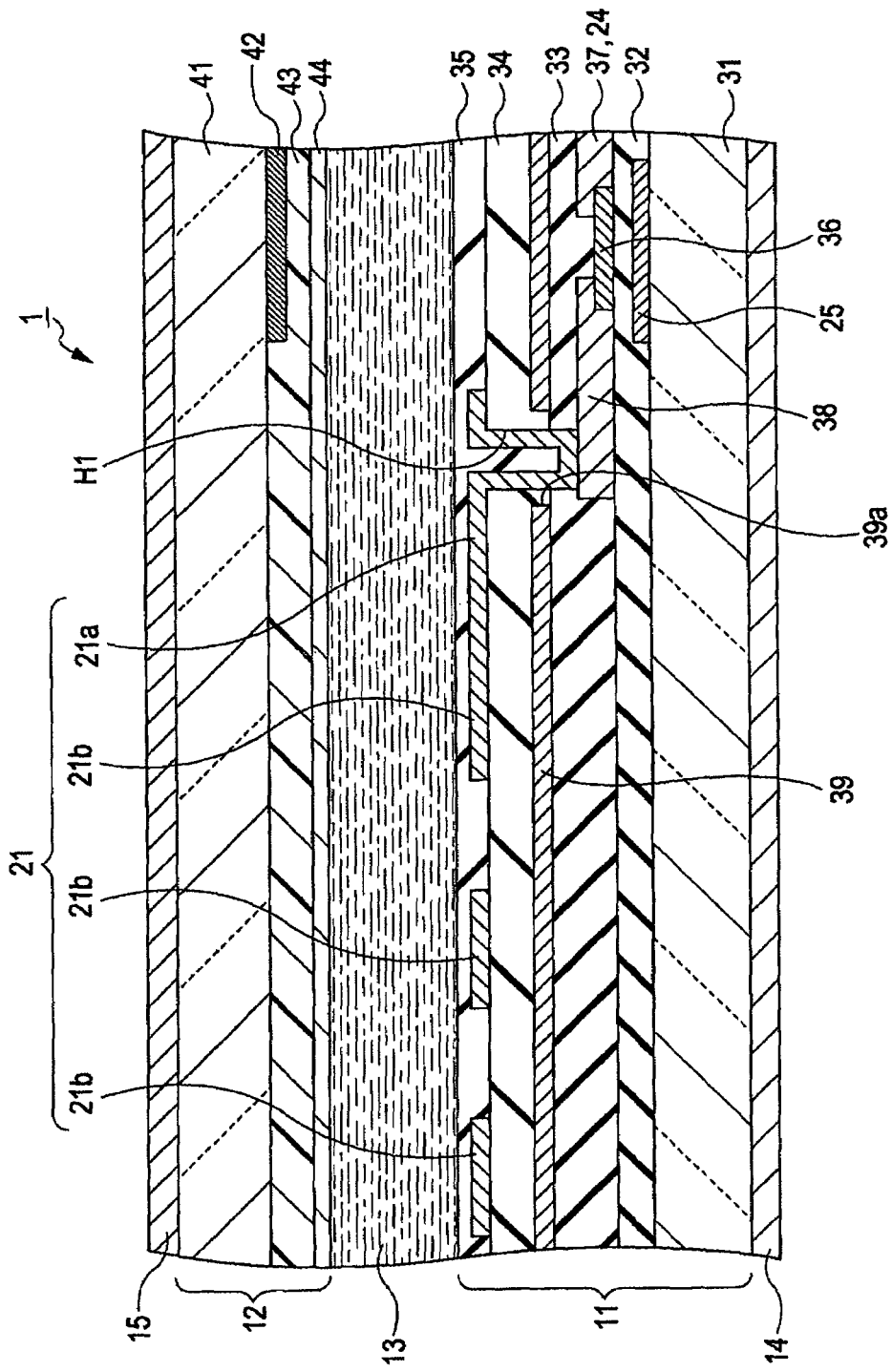
FIG. 4 is a sectional view illustrating a main part of the liquid crystal device taken along line IV-IV of FIG. 3.

The semiconductor layer 36 is formed of semiconductor such as amorphous silicon, and has channel regions which are formed without implanting impurities and source regions and drain regions which are formed by implanting impurities, as shown in FIGS. 3 and 4.

The source electrodes 37 are branched from the data lines 24, and are electrically connected to the source regions of the semiconductor layer 36. The drain electrodes 38 are electrically connected to the drain region of the semiconductor layer 36, and are electrically connected to the pixel electrodes 21 through contact holes H1 penetrating through the first interlayer insulating film 33 and second interlayer insulating film 34.

The common electrode 39 formed of a transparent conductive material such as ITO (indium tin oxide) is provided to cover the first interlayer insulating film 33. The common electrode 39 is positioned to correspond to the contact holes H1, and has openings 39a such that the common electrode 39 is insulated from the pixel electrodes 21 and 22 and the drain electrodes 38. A predetermined reference voltage used to drive the liquid crystal layer 13 is applied to the common electrode 39. For example, as the applied voltage it is possible to use a predetermined constant voltage or a signal generated by switching 0 V or a predetermined constant electric potential into a different predetermined constant electric potential periodically (for every frame period or field period).

The pixel electrodes 21 are formed of a transparent conductive material such as ITO similarly to the common electrode 39. The pixel electrodes 21 are, as shown in FIGS. 3 and 4, formed on the second interlayer insulating film 34 within the sub-display pixels Pc. Each pixel electrode 21 has a substantially trapezoid shape in plan view. Each pixel electrode 21 has a pair of main-line portions 21a and a plurality of band-shaped portions 21b as shown in FIGS. 3 and 4. The pair of main-line portions 21a are disposed at the lengthwise ends of the sub-display pixel Pc, respectively, and extends in substantially parallel to the extending direction of the scanning line 25. One main-line portion 21a of the pair of main-line portions 21a disposed adjacent to the scanning line 25 is electrically connected to the drain electrode 38 of the TFT 23 through the contact hole H1.

Each band-shaped portion 21b extends at a predetermined tilt angle in a lengthwise direction of the sub-display pixel Pc (or the extending direction of the data line 24). In addition, the band-shaped portions 21b are arranged at a distance from each other in a widthwise direction of the sub-display pixel Pc, and are arranged in substantially parallel to each other. Either end of each band-shaped portion 21b is electrically connected to the pair of main-line portions 21a. In addition, among the plurality of band-shaped portions 21b, the some-band-shaped portions 21b, which are disposed at the widthwise ends of the sub-display pixel Pc, are electrically connected to only any one main-line portion 21a of the pair of main-line portions 21a.

The pixel electrodes 22 are formed of a transparent conductive material such as ITO similarly to the common electrode 39. The pixel electrodes 22 are, as shown in FIGS. 3 and 4, formed on the second interlayer insulating film 34 within the viewing-angle control pixels Pb. Each pixel electrode 22 has a substantially trapezoid shape in plan view. Each pixel electrode 22 has a frame-shaped portion 22a having a substantially rectangular frame shape in plan view and a plurality of band-shaped portions 22b formed inside the frame-shaped portion 22a. The frame-shaped portion 22a is electrically connected to a branch portion 26ab branched from the pectinate portion 26a of the viewing-angle control line 26 through the contact hole H1 penetrating the first interlayer insulating film 33 and the second interlayer insulating film 34. The band-shaped portions 22b extend in parallel to each other in the widthwise direction of the viewing-angle control pixel Pb. Both ends of each band-shaped portion 22b are electrically connected to a part of the frame-shaped portion 22a extending in the lengthwise direction of the viewing-angle control pixel Pb.

In the liquid crystal device 1 as described above, a voltage is applied between the band-shaped portions 21b and 22b and the common electrode 39, and thus an electric field (horizontal electric field) is induced between the pixel electrodes 21 and 22 and the common electrode 39, thereby driving the liquid crystal molecules 13a. By adopting such a configuration, the liquid crystal device 1 has FFS mode electrode structures formed by the pixel electrodes 21 and the common electrode 39 and by the pixel electrodes 22 and the common electrode 39, respectively.

Next, the counter substrate 12 is configured as follows.

The counter substrate 12 has, as shown in FIG. 4, a substrate body 411 formed of the same material as the substrate body 31, and a light-shielding film 42, color filter layer 43, and alignment film 44 which are sequentially laminated from a side of the liquid crystal layer 13 facing the substrate body 41 toward the liquid crystal layer 13.

The light-shielding film 42 formed of a material having a light blocking effect is positioned on the side of the substrate body 41 facing the liquid crystal layer 13 so as to partition the sub-display pixels Pc and to partition the viewing-angle control pixels Pb. The color filter layer 43 includes color filter layers having R, G, and B colors and is disposed to correspond to the sub-display pixels Pc. However, the color filter layer 43 is not provided on regions corresponding to the viewing-angle control pixels Pb. The alignment film 44 is formed of a transparent material such as polyimide resin similarly to the alignment film 35 as shown in FIG. 4. A surface of the alignment film 44 facing the liquid crystal layer 13 is subjected to an alignment process. The process sets an initial orientation direction of the liquid crystal molecules 13a as a predetermined direction (the extending direction of the data line 24 in this example) anti-parallel to the alignment film 35.

Operation of Liquid Crystal Device

Next, operations of the liquid crystal device 1 will be described with reference to FIGS. 5A and 5B.

Figure 5A:
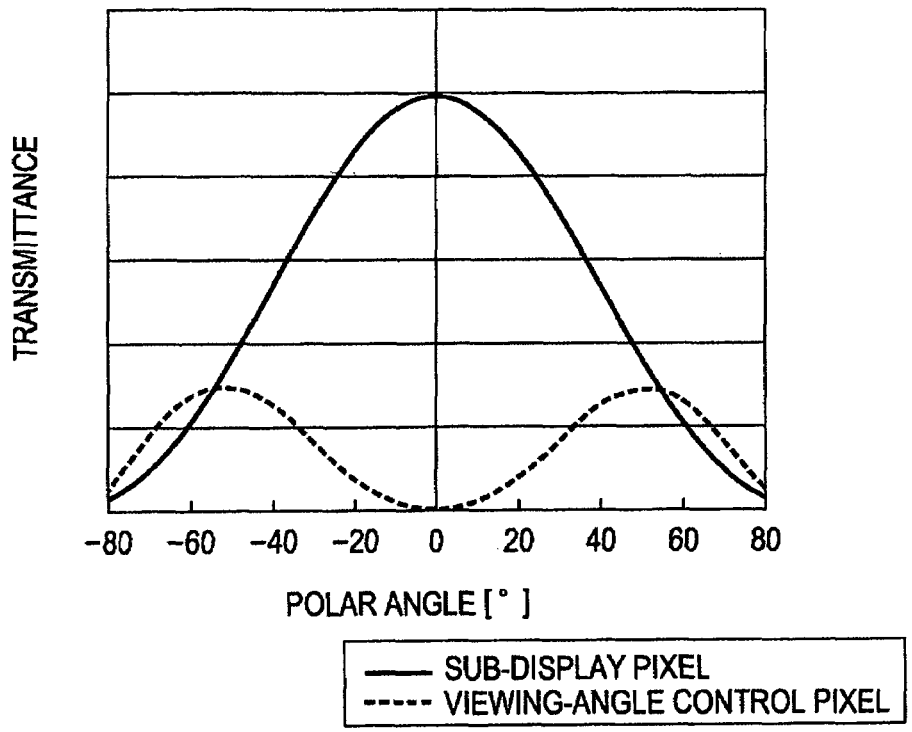
FIG. 5A and FIG. 5B are graphs illustrating viewing angle characteristics in transmittance of the sub-display pixels and the viewing-angle control pixels, and viewing angle characteristics in contrast at ON and OFF states of a viewing-angle control.
Figure 5B:
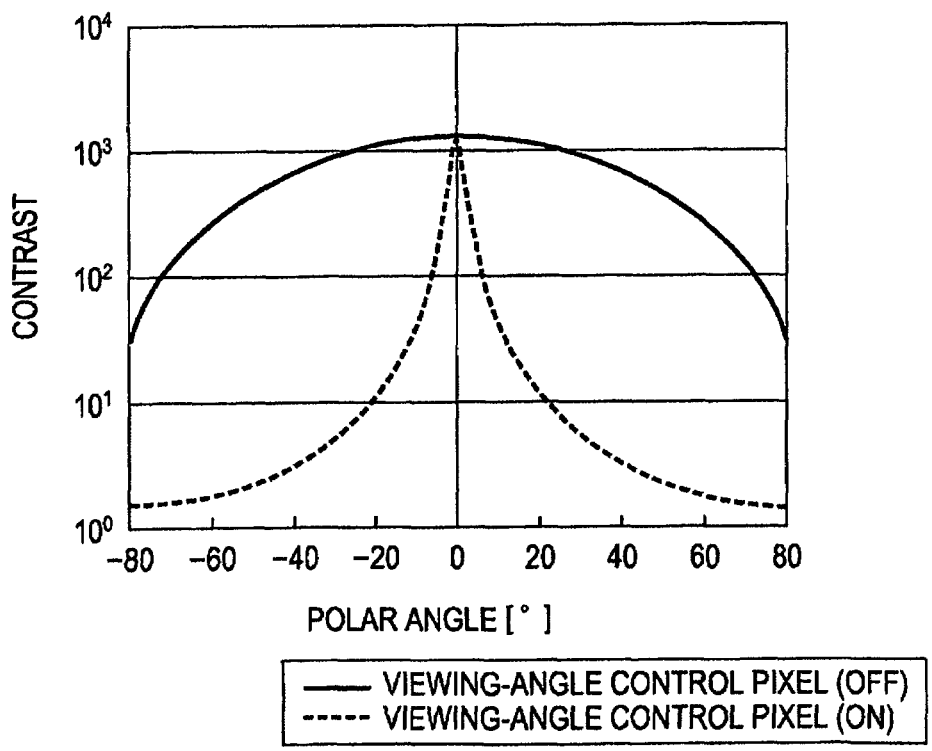

FIG. 5A is a graph illustrating an example of viewing angle characteristics in transmittance (or brightness) of the sub-display pixels Pc and the viewing-angle control pixels Pb when a constant voltage is applied to the sub-display pixels Pc and the viewing-angle control pixels Pb. In FIG. 5A, the vertical axis represents transmittance, and the horizontal axis represents a polar angle (°) of ±θ inclined from the normal direction in a direction substantially perpendicular to the extending direction of the data line 24 or a direction of an absorption axis of the second polarizer 15 when an azimuth angle of the normal direction (front direction) to a display surface of the liquid crystal device 1 is set as 0. In FIG. 5A, the transmittance represented by the vertical axis increases as the curve moves to the upper side of the drawing. FIG. 5B is a graph illustrating an example of viewing angle characteristics in contrast when the viewing-angle control pixels Pb are driven and not driven. In FIG. 5B, the vertical axis represents contrast, and the horizontal axis represents a polar angle (°) the same as that in FIG. 5A.

Light originated from the backlight is linearly polarized by the first polarizer 14, and is incident to the liquid crystal layer 13. The sub-display pixel Pc is not driven when a voltage is not applied between the pixel electrode 21 and the common electrode 39. In this case, the linearly polarized light incident to the liquid crystal layer 13 exits from the liquid crystal layer 13 in a polarized state the same as that at incidence to the liquid crystal layer 13. The linear polarized light is blocked by the second polarizer 15 since the polarized direction is parallel to the absorption axis of the second polarizer 15. Accordingly, the sub-display pixel Pc performs dark display when not driven. In addition, the sub-display pixel Pc performs dark display regardless of whether viewed from the front or the oblique direction.

The sub-display pixel Pc is driven when a voltage is applied between the pixel electrode 21 and the common electrode 39. In this case, the liquid crystal molecules 13a, which are initially oriented in substantially parallel to the lengthwise direction of the pixel electrode 21, are rotated on the surfaces of the array substrate 11 and counter substrate 12 as the arrows A1 shown in FIG. 3, and are reoriented in a direction crossing (in this example, substantially orthogonal to) the lengthwise direction of the pixel electrode 21. Thereby, the linear polarized light incident to the liquid crystal layer 13 has a predetermined phase difference caused by the liquid crystal layer 13, is changed into linear polarized light orthogonal to the polarization direction at incidence, exits from the liquid crystal layer 13, and transmits through the second polarizer 15 again. Accordingly, the sub-display pixel Pc performs bright display visible as display light when driven. In the sub-display pixel Pc, transmittance (or brightness) is at the maximum when it is viewed from the front, and transmittance (or brightness) decreases as a polar angle thereof increases when it is viewed from the oblique direction.

On the other hand, the viewing-angle control pixel Pb is not driven when a voltage is not applied between the pixel electrode 22 and the common electrode 39. In this case, the viewing-angle control pixel Pb performs dark display similarly to the above description. In addition, the viewing-angle control pixel Pb performs dark display regardless of whether viewed from the front or the oblique direction (direction oblique to the normal direction of the display surface of the liquid crystal device 1).

The viewing-angle control pixel Pb is driven when a voltage is applied between the pixel electrode 22 and the common electrode 39. In this case, the liquid crystal molecules 13a, which are initially oriented in a direction crossing (in this example, substantially orthogonal to) the extending direction of the band-shaped portions 22b, are reoriented in a direction (the normal direction) perpendicular to the surfaces of the array substrate 11 and counter substrate 12, as the arrows A2 shown in FIG. 3. The viewing-angle control pixel Pb performs dark display when viewed from the front since the phase difference is not varied in the liquid crystal layer 13 as shown in FIG. 5A. In addition, when the viewing-angle control pixel Pb is viewed from the oblique direction (direction oblique to the normal direction of the display surface of the liquid crystal device 1) to the absorption axis direction of the second polarizer 15, brightness (or transmittance) varies with the polar angle according to the phase difference variation in the liquid crystal layer 13. For example, brightness increases (bright display) as the polar angle increases, and brightness decreases (dark display) as the polar angle further increases. In the viewing-angle control pixel Pb according to the example, the peaks of the transmittance exist in the polar angle ranges of +40° to +60° and −40° to −60°.

In the above-mentioned embodiment, the viewing angle characteristic can be changed depending on whether or not the viewing-angle control pixels Pb are driven. Specifically, when the viewing-angle control pixels Pb are not driven, it is possible to view an image formed within the image display region V by appropriately driving or not driving the sub-display pixels Pc, regardless of whether the image is viewed from the front or the oblique direction. In addition, when the viewing-angle control pixels Pb are not driven, contrast is at the maximum as it is viewed from the front, and decreases as the polar angle increases as it is viewed from the oblique direction, as shown in FIG. 5B. In this example, when the viewing-angle control pixels Pb are not driven, it is possible to perform a wide viewing-angle display mode in which contrast is more than about 20 in the polar angle range of −80° to +80°.

On the other hand, when the viewing-angle control pixels Pb are driven, it is possible to view an image formed within the image display region V by appropriately driving or not driving the sub-display pixels Pc, as the image is viewed from the front, and it is difficult to view the image since contrast is lowered as the image is viewed from the oblique direction. In addition, when the viewing-angle control pixels Pb are driven, contrast is at the maximum as it is viewed from the front, and rapidly decreases as the polar angle increases as it is viewed from the oblique direction, as shown in FIG. 5B. In this example, when the viewing-angle control pixels Pb are driven, it is possible to perform a narrow viewing-angle display mode which makes it difficult to view an image since contrast thereof is less than about 2 in the polar angle range less than −40° or more than +40°.

Optimization of Driving Voltage of Viewing-Angle Control Pixel

The viewing-angle control pixel Pb as described above has a peak of transmittance in the polar angle ranges of +40° to +60° and −40° to −60°, and it is difficult to view the image at the peak. Thus, in the embodiment, a driving voltage causing the maximum transmittance (or brightness) of the viewing-angle control pixel Pb is inspected on the basis of relationship to the sub-display pixel Pc in either polar angle range of +40° to +60° or polar angle range of −40° to −60°.

Figure 6A:
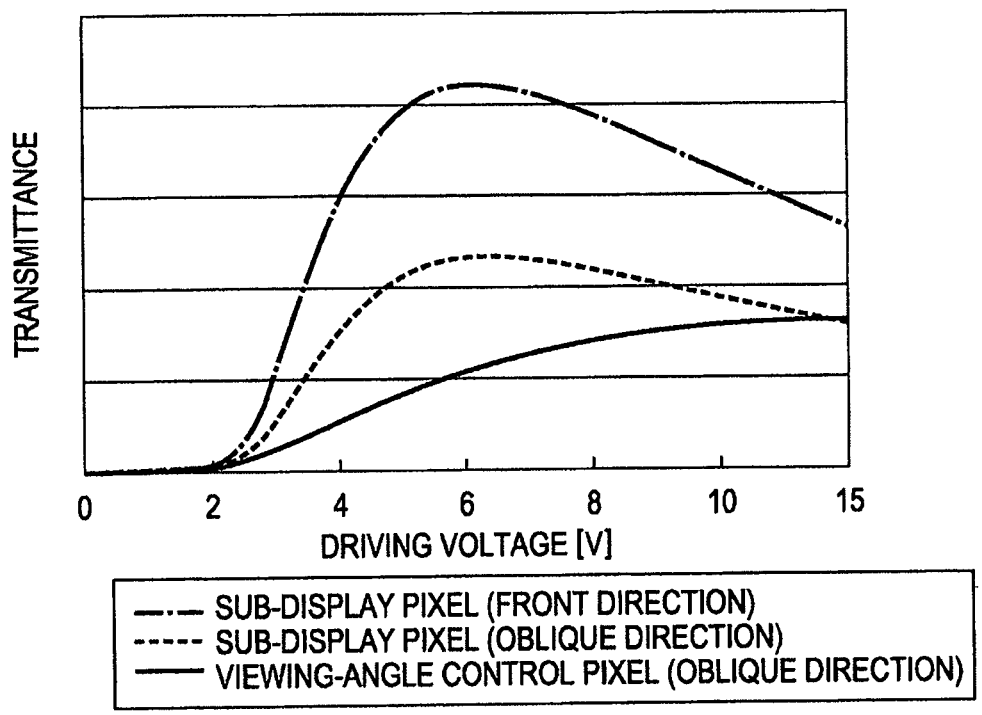

FIG. 6A is a graph illustrating an example of relationship between driving voltages and transmittances corresponding thereto of the sub-display pixels Pc and the viewing-angle control pixels Pb in either polar angle range of +40° to +60° or polar angle range of −40° to −60°. In FIG. 6A, the vertical axis represents transmittance, and the horizontal axis represents a driving voltage V for driving the sub-display pixels Pc and the viewing-angle control pixels Pb. In FIG. 6A, the transmittance represented by the vertical axis increases as the curve moves to the upper side of the drawing. In FIG. 6A, the dashed line is a curve representing relationship between transmittance and driving voltage (voltage applied between the pixel electrodes 21 and the common electrode 39) corresponding thereto of the sub-display pixels Pc in the case of the oblique direction (polar angle range of +40° to +60° or polar angle range of −40° to −60°), and the solid line is a curve representing relationship between transmittance and driving voltage (voltage applied between the pixel electrodes 22 and the common electrode 39) corresponding thereto of the viewing-angle control pixel Pb in the case of the oblique direction (polar angle range of +40° to +60° or polar angle range of −40° to −60°). In FIG. 6A, the chain line indicates, as a reference, a curve representing relationship between driving voltage and transmittance corresponding thereto of the sub-display pixels Pc in the case of the front direction (polar angle 0°).

In FIG. 6A, a driving voltage corresponding to the maximum value of transmittance of the sub-display pixels Pc in the polar angle range of +40° to +60° or the polar angle range of −40° to −60° is about 6V. On the other hand, a driving voltage corresponding to the maximum value of transmittance of the viewing-angle control pixels Pb in the polar angle range of +40° to +60° or the polar angle range of −40° to −60° is in the range of 10 to 15V. Furthermore, a driving voltage corresponding to the maximum value of transmittance of the sub-display pixels Pc in the case of the front direction is also about 6V. Specifically, it can be seen from the above that the driving voltage corresponding to the maximum value of transmittance of the viewing-angle control pixels Pb is higher than the driving voltage corresponding to the maximum value of transmittance of the sub-display pixels Pc. The reason is that operations of the liquid crystal molecules 13a within the sub-display pixel Pc and the viewing-angle control pixel Pb at the time of driving are different from each other. That is, the reason is that the liquid crystal molecules 13a in the sub-display pixel Pc are moved in a rotation direction along the surfaces of the array substrate 11 and counter substrate 12 at the time of driving, while the liquid crystal molecules 13a in the viewing-angle control pixel Pb are moved in a perpendicular direction to the surfaces of the array substrate 11 and counter substrate 12.

As described above, the optimum driving voltages of the sub-display pixel Pc and the viewing-angle control pixel Pb are different from each other. For this reason, it may be possible to obtain an excellent narrow viewing-angle display effect by setting the driving voltage of the viewing-angle control pixel Pb higher than the driving voltage of the sub-display pixel Pc. The effect may be obtained independently of pitches of the sub-display pixel PC and the viewing-angle control pixel Pb, pitches of the band-shaped portions 21b and 22b, or a thickness of the liquid crystal layer 13.

Figure 6B:
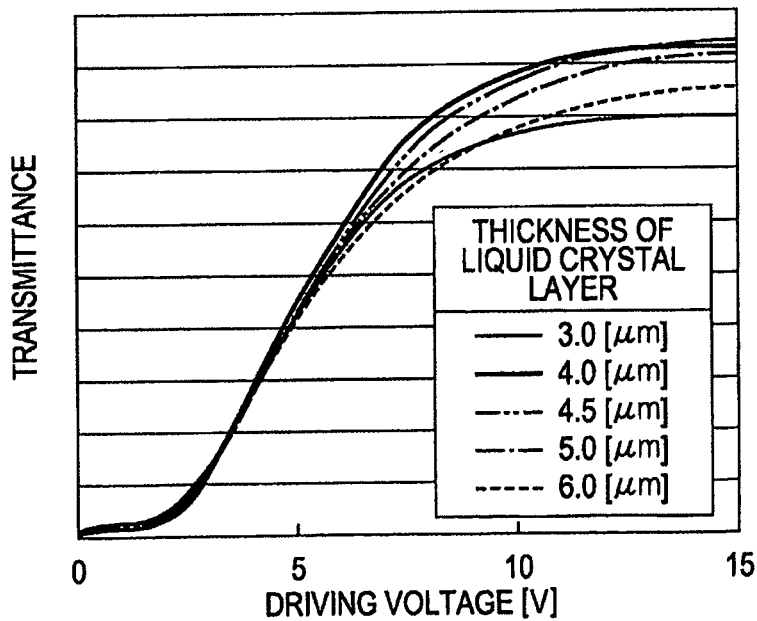

FIG. 6B is a graph illustrating an example of relationship between transmittance and driving voltage corresponding thereto of the viewing-angle control pixel Pb in the case of the oblique direction (polar angle range of +40° to +60° or polar angle range of −40° to −60°) when a thickness μm of the liquid crystal layer 13 is appropriately varied. In FIG. 6B, the transmittance represented by the vertical axis increases as the curve moves to the upper side of the drawing. In FIG. 6B, the driving voltage corresponding to the maximum value of transmittance of the viewing-angle control pixel Pb in the polar angle range of +40° to +60° or the polar angle range −40° to −60° is in the range of 10 to 15V almost independently of thickens variation of the liquid crystal layer 13. Accordingly, it can be seen from this example that it may be possible to obtain an excellent narrow viewing-angle display effect by setting the driving voltage of the viewing-angle control pixel Pb higher than the driving voltage of the sub-display pixel Pc.

According to the liquid crystal device 1 of the embodiment as described above, it is possible to lower image contrast as the display screen is viewed from the oblique direction by making the voltage applied between the pixel electrode 22 and the common electrode 39 in the viewing-angle control pixel Pb higher than the voltage applied between the pixel electrode 21 and the common electrode 39 in the sub-display pixel Pc.

However, the driving voltage of the viewing-angle control pixel Pb is in the range of 10 to 15V, and that is very high. For this reason, it is necessary to consider a withstand voltage of the data line driving circuit 16 in order to drive the viewing-angle control pixel Pb by use of the TFT 23 similarly to the method of driving the sub-display pixel Pc.

In this embodiment, the method of driving the viewing-angle control pixels Pb is set differently from the method of driving the sub-display pixels Pc. Specifically, in the embodiment, the pixel electrodes 22 in the viewing-angle control pixels Pb are directly connected to each viewing-angle control line 26 electrically connected to the viewing-angle control line driving circuit 18 as described above. By adopting such a configuration, it is possible to easily and efficiently apply a high voltage to the viewing-angle control pixels Pb without applying a load to the data line driving circuit 16 and the like by use of the viewing-angle control line driving circuit 18 and the like. That is, it is possible to easily realize the narrow viewing-angle display mode by supplying the viewing-angle control signal K (ON), which corresponds to the voltage of 10 to 15V higher than the driving voltage of the sub-display pixel Pc, to the pixel electrodes 22 by use of the viewing-angle control line driving circuit 18, independently of the data line driving circuit 16 and scanning line driving circuit 17. In addition, it is possible to easily realize the wide viewing-angle display mode by stopping supplying the viewing-angle control signal K (OFF) to the pixel electrodes 22 by use of the viewing-angle control line driving circuit 18, independently of the data line driving circuit 16 and scanning line driving circuit 17. In the embodiment, the viewing-angle control line driving circuit 18 for driving the pixel electrodes 22 is provided in the liquid crystal device 1. The invention is not limited thereto, and the viewing-angle control line driving circuit 18 may be provided in the FPC 20 or the electronic apparatus to be described later.

MODIFIED EXAMPLES

The invention is not limited to the embodiments mentioned above, and may be modified in various forms without departing from the technical spirit of the invention.

For example, in the embodiments, each pixel electrode and common electrode have the FFS mode electrode structure, but in the invention, a different electrode structure using a so-called horizontal electric field mode such as IPS (In-Plane Switching) mode may be adopted. In this case, it may be possible to adopt a configuration from which the interlayer insulating film is appropriately excluded, or it may be possible to adopt a configuration in which a different interlayer insulating film is formed.

In the invention, by dividing the image display region V of the liquid crystal device 1 into a plurality of display regions, it is possible to perform different viewing-angle controls (that is, the narrow viewing-angle control and the wide viewing-angle control) on the divided display regions, respectively.

This point will be described with reference to FIGS. 7 and 8. FIG. 7 is a circuit diagram of a viewing-angle control equivalent circuit 600 illustrating an electric configuration of the viewing-angle control line driving circuit 18 according to a modified example of the invention and the viewing-angle control lines 26 electrically connected thereto. In FIG. 7, the display pixels Pa in the image display region V are omitted in the drawing.

In the viewing-angle control equivalent circuit 600, there are provided the plurality of viewing-angle control lines 26 to which viewing-angle control signals K1, K2, K3, . . . , Kn-2, Kn-1, Kn (n is a natural number) are supplied. Each viewing-angle control line 26 is directly and electrically connected to the pixel electrodes 22 of the viewing-angle control pixels Pb arrayed in columns in the extending direction thereof, and is electrically connected to the viewing-angle control line driving circuit 18.

By adopting such a configuration, it is possible to supply the viewing-angle control signals K1, K2, K3, . . . , Kn-2, Kn-1, Kn as ON or OFF signals to the viewing-angle control lines 26 by use of the viewing-angle control line driving circuit 18, independently of the data line driving circuit 16 and the scanning line driving circuit 17. For example, it is possible to easily realize the narrow viewing-angle display mode by supplying the viewing-angle control signals (ON), which correspond to the voltage of 10 to 15V higher than the driving voltage of the sub-display pixels Pc, from the viewing-angle control line driving circuit 18 through the viewing-angle control lines 26 to the pixel electrodes 22. On the other hand, it is possible to realize the wide viewing-angle display mode by stopping supplying the viewing-angle control signals (OFF) from the viewing-angle control line driving circuit 18 through the viewing-angle control lines 26 to the pixel electrodes 22.

Accordingly, in the liquid crystal device having the viewing-angle control equivalent circuit 600, it may be possible to adopt such a configuration in which the image display region V is divided into a plurality of display regions and images different from each other are displayed on the respective divided display regions, by using a so-called multi picture display technique. In this case, different viewing-angle control signals (ON and OFF signals) are simultaneously supplied to the viewing-angle control lines 26 on the respective divided display regions, by the viewing-angle control line driving circuit 18.

Figure 8A:
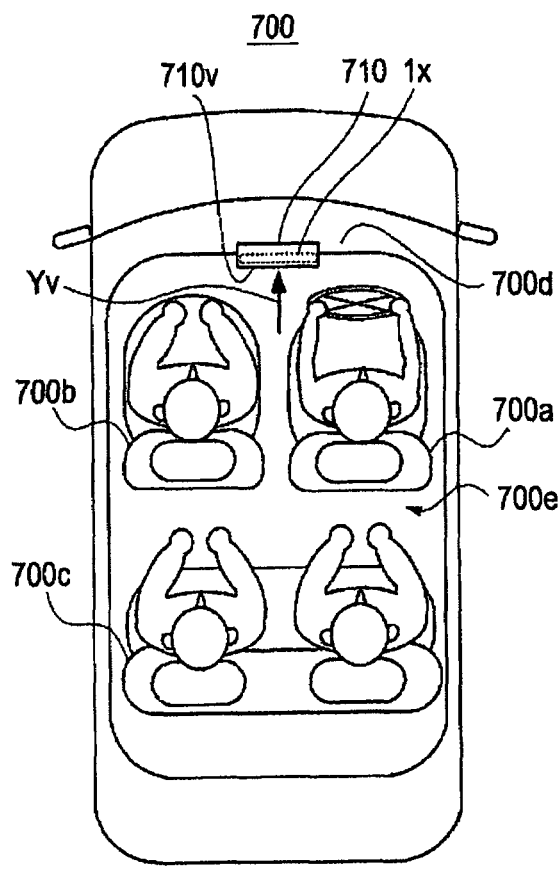
FIGS. 8A and 8B are diagrams illustrating an exemplary configuration of a navigation system mounted on a vehicle, in which an image display region is divided into a plurality of display regions and different viewing-angle controls are performed on the divided display regions, respectively.
Figure 8B:
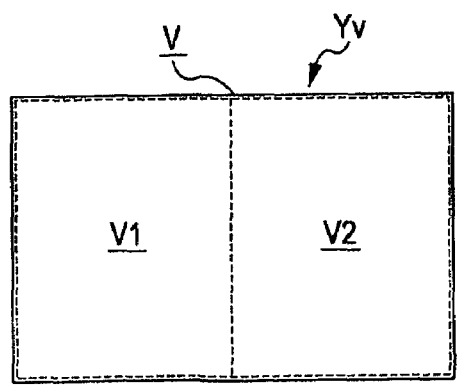

For example, FIG. 8A shows an example in which a liquid crystal device 1x having the viewing-angle control equivalent circuit 600 is applied to a navigation system 710 of a vehicle 700. FIG. 8B shows a top plan view of a display screen 710v of the navigation system 710 as the navigation system 710 is viewed from the arrow direction Yv of FIG. 8A.

In a vehicle interior 700e of the vehicle 700, there are provided a driver's seat 700a, a front passenger seat 700b neighbored to the driver's seat 700a, a back seat 700c positioned in the rear of the driver's seat 700a and the front passenger seat 700b, a dashboard 700d positioned in front of the driver's seat 700a and the front passenger seat 700b, and a navigation system 710 installed in substantially the center of the dashboard 700d. The navigation system 710 has a display screen 710v on which an image is displayed. The liquid crystal device 1x is mounted on a position corresponding to the display screen 710v in the navigation system 710. In this case, a driver of the driver's seat 700a and a passenger of the front passenger seat 700b are positioned obliquely to the display screen 710v of the navigation system 710, and a passenger of the back seat 700c is positioned in front of the display screen 710v of the navigation system 710.

By using a so-called dual picture display technique in the display screen 710v of the navigation system 710, it is assumed that different images are displayed on respective two display regions V1 and V2 into which the image display region V is divided. For example, it is assumed that a map for guiding a user's destination and the like is displayed on the display region V2 positioned close to the driver's seat 700a and an image (TV program, movie, or the like) different from the map is displayed on the display region V1 positioned close to the front passenger seat 700b. In this case, a viewing-angle control signal (OFF signal) is supplied through the corresponding viewing-angle control lines 26 to the viewing-angle control pixels Pb for the display region V2 on which the map is displayed, while a viewing-angle control signal (ON signal) is supplied through the corresponding viewing-angle control lines 26 to the viewing-angle control pixels Pb for the display region V1 on which the image different from the map is displayed. By adopting such a configuration, the wide viewing-angle control is performed on the display region V2 on which the map is displayed, while the narrow viewing-angle control is performed on the display region V1 on which the image different from the map is displayed. As a result, only the map can be allowed to be visible for the driver sitting on the driver's seat 700a, and thus it is possible to secure driving safety. On the other hand, both of the map and the image may be allowed to be visible for a passenger sitting on the back seat 700c. In the invention, a configuration of the viewing-angle control equivalent circuit is not limited to the configuration shown in FIG. 7, and may be modified in various forms without departing from the technical spirit of the invention.

In the above-mentioned embodiment, the extending direction of the band-shaped portion 21b of the pixel electrode 21 is defined as a direction extending at a predetermined tilt angle to the extending direction of the data line 24, and the extending direction of the band-shaped portion 22b of the pixel electrode 22 is defined as a direction substantially orthogonal to the extending direction of the data line 24, so as to obtain the narrow viewing-angle display effect as viewed from the oblique direction to the absorption axis direction of the second polarizer 15. The invention is not limited thereto, and the extending direction of the band-shaped portion 21b of the pixel electrode 21 may be defined as a direction extending at a predetermined tilt angle to a direction substantially orthogonal to the extending direction of the data line 24, and the extending direction of the band-shaped portion 22b of the pixel electrode 22 may be defined as a direction substantially parallel to the extending direction of the data line 24, so as to obtain the narrow viewing-angle display effect as viewed from the oblique direction to a transmission axis direction (a direction orthogonal to the absorption axis direction) of the second polarizer 15.

Figure 9A:
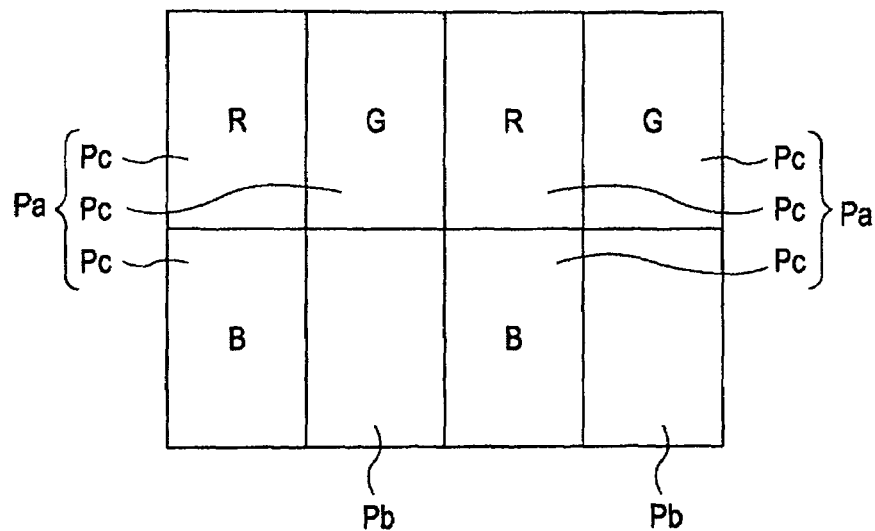
FIGS. 9A and 9B are top plan views illustrating different array states of the sub-display pixels and the viewing-angle control pixels.

In the above-mentioned embodiment, the three sub-display pixels Pc constituting each display pixel Pa are arranged in a single direction, and each viewing-angle control pixel Pb is arranged adjacent to the display pixel Pa in the corresponding single direction. The invention is not limited thereto, and the pixels may be arranged differently. For example, as shown in FIG. 9A, two sub-display pixels Pc outputting color light components of R (red) and G (green) among the three sub-display pixels Pc constituting each display pixel Pa may be arranged adjacent to each other in a single direction, the sub-display pixel Pc outputting a color light component of B (blue) may be arranged adjacent thereto in a direction substantially orthogonal to the corresponding single direction, and each viewing-angle control pixel Pb may be arranged adjacent to the sub-display pixel Pc outputting the color light component of B (blue) in a single direction.

Figure 9B:
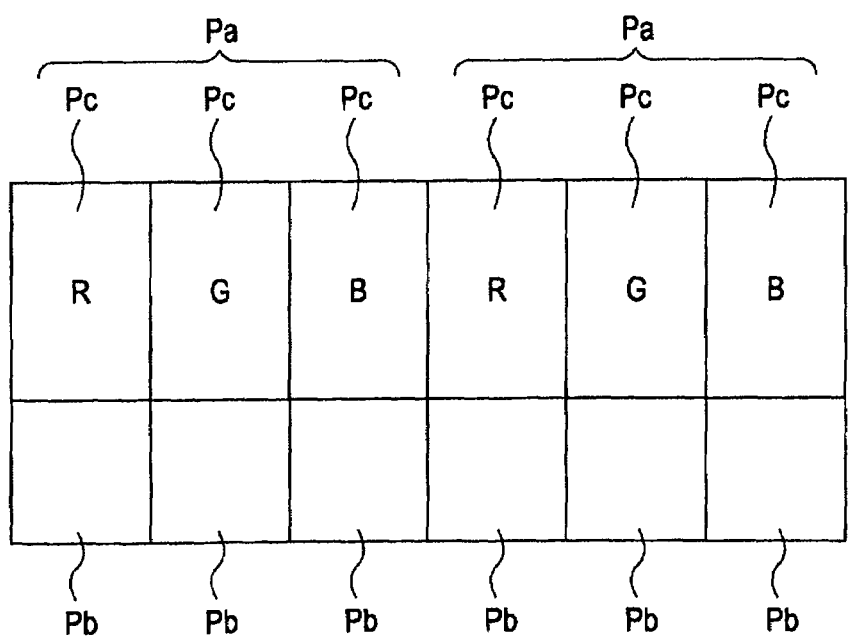

In the above-mentioned embodiment, although one viewing-angle control pixel Pb is disposed to correspond to one display pixel Pa, the invention is not limited thereto, and each viewing-angle control pixel Pb may be disposed to correspond to each of the three sub-display pixels Pc constituting the one display pixel Pa. For example, as shown in FIG. 9B, each viewing-angle control pixel Pb may be disposed adjacent to each of the three sub-display pixels Pc in a direction orthogonal to a single direction which is a direction of arranging the three sub-display pixels Pc constituting the display pixel Pa. As described above, the viewing-angle control pixels Pb are disposed to correspond to the plurality of sub-display pixels Pc, respectively, and thus it is possible to lower contrast for each sub-display pixel Pc as viewed from the oblique direction. As a result, viewing-angle control performance may be improved by the viewing-angle control pixels Pb.

Figure 10A:
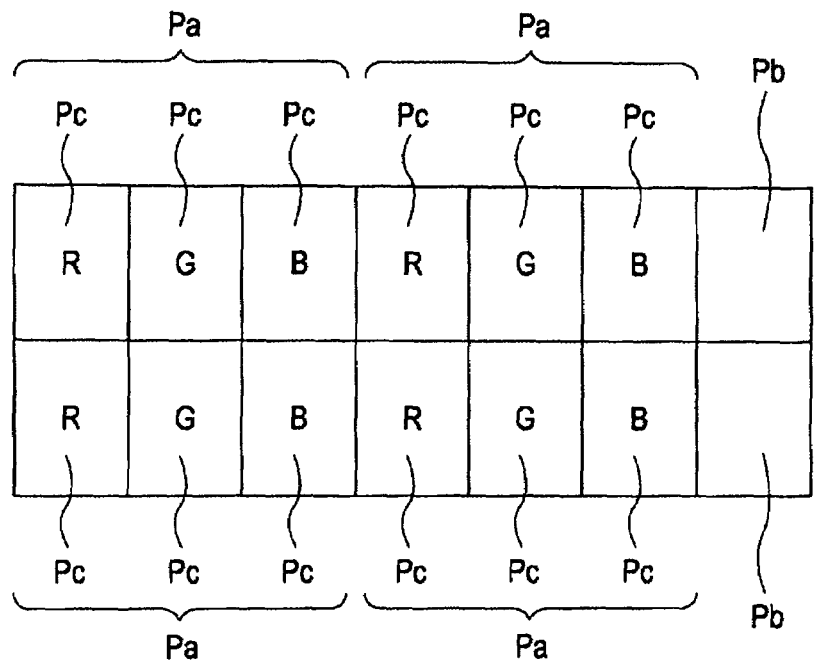
FIGS. 10A and 10B are top plan views illustrating different array states of the sub-display pixels and the viewing-angle control pixels.
Figure 10B:
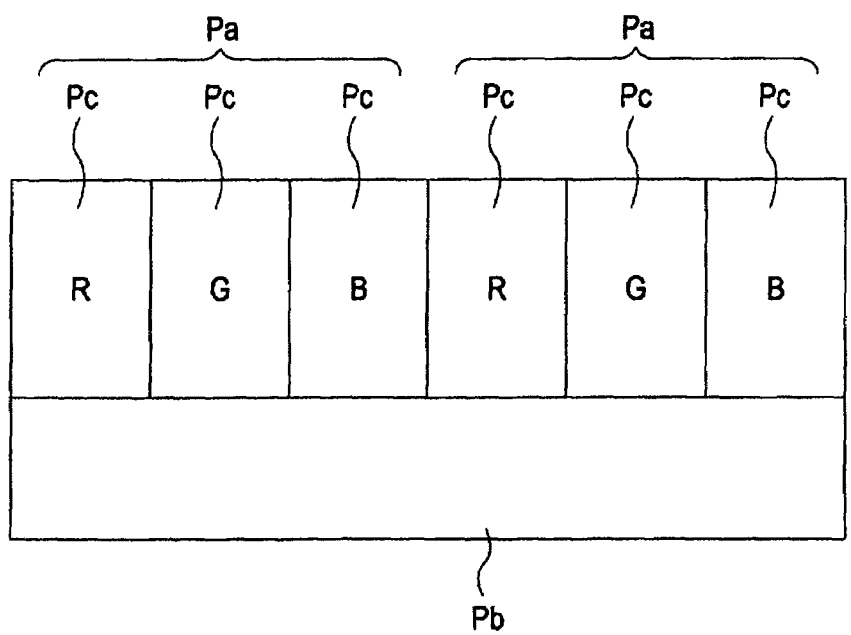

The invention is not limited to the configuration mentioned above, one viewing-angle control pixel Pb may be provided to correspond to a plurality of (at least one) display pixels Pa. FIG. 10A shows an exemplary configuration in which one viewing-angle control pixel Pb is provided to correspond to two display pixels Pa. In this exemplary configuration, the display pixels Pa each including the sub-display pixels Pc of R, G, and B are arranged in a matrix shape. Two display pixels Pa are neighbored to each other in a single direction, and one viewing-angle control pixel Pb is disposed at a position adjacent to one display pixel Pa of those in the single direction. FIG. 10B shows another exemplary configuration in which one viewing-angle control pixel Pb is provided to correspond to two display pixels Pa. In this exemplary configuration, one display pixel Pa is disposed adjacent to another display pixel Pa in a single direction of arranging the sub-display pixels Pc of R, G, and B. One viewing-angle control pixel Pb is disposed adjacent to the one display pixel Pa and the another display pixel Pa in a direction substantially orthogonal to the single direction. By adopting the configurations, it is possible to improve definition of the displayed image as an area of the display pixel Pa in the image display region V can be increased.

In the invention, the viewing-angle control pixels Pb may be provided with a color filter layer in order to display colors equivalent to the colors displayed by the corresponding sub-display-pixels Pc, similarly to the sub-display pixel Pc. In this case, it is preferable that each viewing-angle control pixel Pb be able to display light stronger than that of the sub-display pixel Pc by forming an opening through the color filter layer within the viewing-angle control pixel Pb even when a thickness of the color filter layer within the viewing-angle control pixel Pb is smaller than or equal to a thickness of the color filter layer within the sub-display pixel Pc. By adopting such a configuration, it is possible to match light intensity of the viewing-angle control pixel Pb with light intensity of the sub-display pixel Pc even when the area of the viewing-angle control pixel Pb is set smaller than that of the sub-display pixel Pc.

Electronic Apparatus

Hereinafter, an example of an electronic apparatus using the liquid crystal device 1 according to the embodiments of the invention will be described with reference to FIG. 11.

Figure 11A:
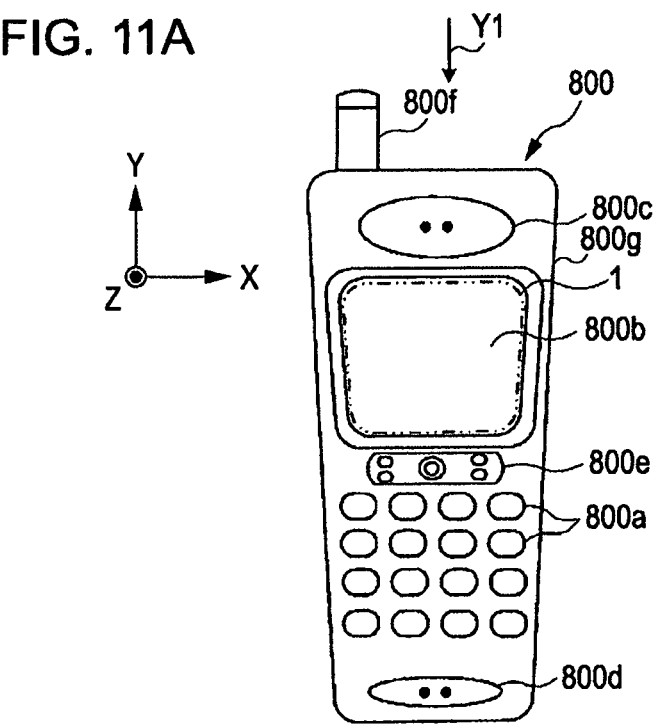
FIGS. 11A and 11B are front and side views illustrating a configuration of a mobile phone according to an embodiment of the invention.
Figure 11B:
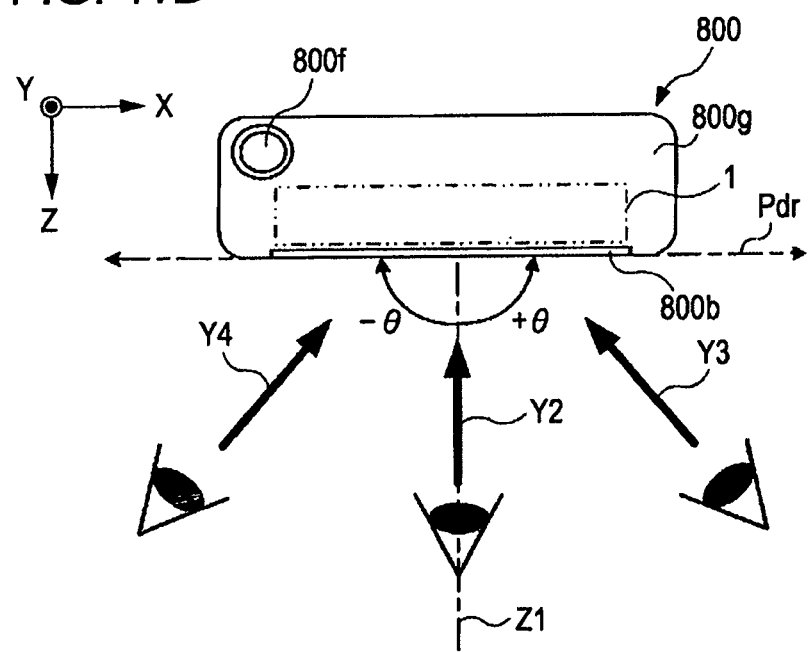

FIG. 11A is a front view illustrating a mobile phone 800 as an example of the electronic apparatus using any one (hereinafter, it is referred to as "liquid crystal device 1") of the liquid crystal devices 1 and 1x according to the embodiments, as viewed from the display screen side. FIG. 11B is a side view of the mobile phone 800 as the mobile phone 800 shown in FIG. 11A is viewed from a side of a transceiver antenna 800f (direction of arrow Y1). Hereinafter, a thickness direction of the mobile phone 800 of the invention is defined as Z direction, up and down directions of the mobile phone 800 in FIG. 11A is defined as ±Y direction, and right and left directions of the mobile phone 800 in FIG. 11A is defined as ±X direction. In addition, a direction Pdr of a polar angle (°) is defined as a direction of an angle of ±θ inclined in the right and left directions to the normal direction Z1 of a display unit 800b in the mobile phone 800.

The mobile phone 800 is configured to include a plurality of operation buttons 800a, which is provided on the outer surface of the casing 800g for operating inputs such as a mail, the display unit 800b for displaying images (displayed image) such as characters, a figure, and a picture, an earpiece 800c, a mouthpiece 800d, a function control button 800e for setting various functions, and the transceiver antenna 800f provided on one side of the casing 800g. The casing 800g houses the liquid crystal device 1 according to the embodiment at the position corresponding to the display unit 800b. For this reason, in the mobile phone 800, an image can be displayed on the display unit 800b by allowing a user to operate the operation button 800a or the function control button 800e.

In particular, the mobile phone 800 of the invention may be suitably used by selectively switching the wide viewing-angle display mode for making a displayed image visible from any direction in normal use and the narrow viewing-angle display mode for lowering contrast of the displayed image that includes a mail and a picture and making the displayed image hardly visible from the people around a user when the phone is used outdoors, in public surfaces, and the like. Switching a viewing angle between the wide viewing-angle display mode and the narrow viewing-angle display mode may be performed by allowing the user to operate the operation button 800a or the function control button 800e.

In the mobile phone 800, when the user selects the wide viewing-angle display mode, in FIG. 11B, a displayed image is visible in the cases where the display unit 800b is viewed from the front direction Y2 (Z direction) as the normal direction Z1, the display unit 800b is viewed from the right oblique direction Y3 (+polar angle direction Pdr) which is inclined at +θ° from the normal direction Z1 to the display surface of the display unit 800b, and the display unit 800b is viewed from the left oblique direction Y4 (−polar angle direction Pdr) which is inclined at −θ° from the normal direction Z1 to the display surface of the display unit 800b. On the other hand, when the user selects the narrow viewing-angle display mode, in FIG. 11B, a high contrast displayed image is visible in the case where the display unit 800b is viewed from the normal direction Z1, but the displayed image is made invisible since brightness of the viewing-angle control pixel regions of the liquid crystal device 1 varies and contrast of the image is lowered in the case where the display unit 800b is viewed from the right oblique direction Y3 (particularly, polar angle of +40° or more) and the left oblique direction Y4 (particularly, polar angle of −40° or less).

In the embodiment described above, the mobile phone 800 was described as an example of an electronic apparatus to which the liquid crystal device 1 of the invention is applicable. The invention is not limited thereto, and the liquid crystal device 1 of the invention may be applicable to other electronic apparatuses such as a luggable personal computer (so-called laptop), a liquid crystal television, a view finder type or monitor direct view type video tape recorder, a car navigation system, a pager, an electronic diary, an electronic calculator, a word processor, a workstation, a video phone, a POS terminal, and a digital still camera.

The entire disclosure of Japanese Patent Application No. 2008-075087, filed Mar. 24, 2008 is expressly incorporated by reference herein.

What is claimed is:

1. A liquid crystal device comprising:
    a pair of substrates;
    a liquid crystal layer interposed between the pair of substrates;
    a planar region of the pair of substrates having at least one display pixel region, at least one viewing-angle control pixel region, a scanning line extending in a first direction, and a viewing-angle control line connected to the viewing-angle control pixel region and extending in a second direction crossing the first direction, the viewing-angle control pixel region performs dark display in the front direction of surfaces of the pair of substrates and has brightness variable depending on a viewing angle in an oblique direction to the normal direction of the surfaces of the pair of substrates; and
    a pair of electrodes driving the liquid crystal layer is provided in the display pixel region and the viewing-angle control pixel region on one substrate of the pair of substrates,
    wherein a first drive voltage applied between the pair of electrodes in the viewing-angle control pixel region at the time of driving the liquid crystal layer in the viewing-angle control pixel region is a voltage at which transmittance of the viewing-angle control pixel region in the oblique direction becomes maximum,
    the first drive voltage is higher than a second drive voltage applied between the pair of electrodes in the display pixel region, the second drive voltage being a voltage at which transmittance of the display pixel region in the normal direction becomes maximum,
    the first drive voltage is in a range of 10 to 15 V, and
    one electrode of the pair of electrodes in the viewing-angle control pixel region is directly connected to the viewing angle control line supplied with a control signal.

2. The liquid crystal device according to claim 1, wherein assuming that an azimuthal angle of the normal direction of the surfaces of the pair of substrates is 0°, a peak of the transmittance of the viewing-angle control pixel region exists in an angular range of 40° to 60° from the normal direction to the surfaces of the pair of substrates.

3. The liquid crystal-device according to claim 1, wherein the one electrode in the viewing-angle control pixel region is connected to a viewing-angle control line driving circuit through the line.

4. The liquid crystal device according to claim 3, wherein the viewing-angle control line driving circuit simultaneously supplies the control signals different from each other to the viewing-angle control pixel regions, respectively.

5. The liquid crystal device according to claim 1,
    wherein liquid crystal molecules in the display pixel region are moved in a rotation direction along the surfaces of the pair of substrates at the time of driving the liquid crystal layer in the display pixel region,
    wherein liquid crystal molecules in the viewing-angle control pixel region are moved in a perpendicular direction to the surfaces of the pair of substrates at the time of driving the liquid crystal layer in the viewing-angle control pixel region, and
    wherein a direction of an electric field induced between the pair of electrodes in the viewing-angle control pixel region crosses an initial orientation direction of liquid crystal molecules forming the liquid crystal layer along the normal direction of the surfaces of the pair of substrates.

6. The liquid crystal device according to claim 1, wherein the viewing-angle control pixel region is provided to correspond to the at least one display pixel region.

7. An electronic apparatus comprising the liquid crystal device according to claim 1 as a display unit.

8. The liquid crystal device according to claim 1, wherein at least one of the display pixel regions has a plurality of sub-display pixels that output light having different colors, and each viewing-angle control pixel region corresponds to one display pixel region respectively.

9. The liquid crystal device according to claim 8, wherein each viewing-angle control pixel region includes a viewing-angle control pixel that is disposed between a sub-display pixel of a first display pixel region and a sub-display pixel of a second display pixel region disposed adjacent to the first display pixel region.

10. The liquid crystal device according to claim 9, wherein the sub-display pixel of the first display pixel region, the viewing-angle control pixel and the sub-display pixel of the second display pixel region are arranged to extend in the first direction.

11. The liquid crystal device according to claim 9, wherein the sub-display pixel of the first display pixel region that is adjacent to the viewing-angle control pixel outputs light having a different color that the sub-display pixel of the second display pixel region that is adjacent to the viewing-angle control pixel.

12. The liquid crystal device according to claim 1, further comprising a data line that extends in the second direction.

13. A liquid crystal device comprising:
  a pair of substrates;
  a liquid crystal layer interposed between the pair of substrates;
  a planar region of the pair of substrates having at least one display pixel region, at least one viewing-angle control pixel region, a scanning line extending in a first direction, and a viewing-angle control line connected to the viewing-angle control pixel region and extending in a second direction crossing the first direction, the viewing-angle control pixel region performs dark display in the front direction of surfaces of the pair of substrates and has brightness variable depending on a viewing angle in an oblique direction to the normal direction of the surfaces of the pair of substrates; and
  a pair of electrodes driving the liquid crystal layer is provided in the display pixel region and the viewing-angle control pixel region on one substrate of the pair of substrates, wherein
  assuming that an azimuthal angle of the normal direction of the surfaces of the pair of substrates is 0°, a first drive voltage applied between the pair of electrodes in the viewing-angle control pixel region at the time of driving the liquid crystal layer in the viewing-angle control pixel region is a voltage at which transmittance of the viewing-angle control pixel region in an angular range of 40° to 60° from the normal direction becomes maximum,
  the first drive voltage is higher than a second drive voltage applied between the pair of electrodes in the display pixel region, the second drive voltage being a voltage at which transmittance of the display pixel region in the normal direction becomes maximum, and
  one electrode of the pair of electrodes in the viewing-angle control pixel region is directly connected to the viewing angle control line supplied with a control signal.

* * * * *